(12) United States Patent
Braedt

(10) Patent No.: US 8,834,309 B2
(45) Date of Patent: Sep. 16, 2014

(54) MULTIPLE SPROCKET ASSEMBLY

(75) Inventor: Henrik Braedt, Wurzburg (DE)

(73) Assignee: SRAM Deutschland GmbH (DE)

( * ) Notice: Subject to any disclaimer, the term of this patent is extended or adjusted under 35 U.S.C. 154(b) by 483 days.

(21) Appl. No.: 12/497,587

(22) Filed: Jul. 3, 2009

(65) Prior Publication Data

US 2010/0004081 A1 Jan. 7, 2010

(30) Foreign Application Priority Data

Jul. 3, 2008 (DE) .......................... 10 2008 031 162

(51) Int. Cl.
*F16H 55/12* (2006.01)
*F16H 55/30* (2006.01)
*B62M 9/12* (2006.01)
*B62M 9/10* (2006.01)

(52) U.S. Cl.
CPC .. *B62M 9/12* (2013.01); *B62M 9/10* (2013.01)
USPC ....................................................... 474/160

(58) Field of Classification Search
CPC ........... B62M 9/10; B62M 9/105; B62M 9/12
USPC ....................................................... 474/160
See application file for complete search history.

(56) References Cited

U.S. PATENT DOCUMENTS

| | | | |
|---|---|---|---|
| 4,044,621 A * | 8/1977 | McGregor et al. ............. | 474/144 |
| 4,047,603 A * | 9/1977 | Ozaki ............................... | 192/64 |
| 5,087,226 A | 2/1992 | Nagano | |
| 5,791,203 A | 8/1998 | Chen et al. | |
| 6,102,821 A * | 8/2000 | Nakamura ..................... | 474/160 |
| 6,340,338 B1 * | 1/2002 | Kamada ......................... | 474/160 |
| 2005/0014590 A1 | 1/2005 | Wen | |
| 2005/0032596 A1 | 2/2005 | Nonoshita et al. | |
| 2005/0090349 A1 * | 4/2005 | Lee ................................. | 474/160 |
| 2007/0049437 A1 * | 3/2007 | Wickliffe ....................... | 474/152 |
| 2008/0004143 A1 | 1/2008 | Kanehisa et al. | |

FOREIGN PATENT DOCUMENTS

| | | |
|---|---|---|
| DE | 1 02 838 A | 4/1899 |
| DE | 36 04 876 A1 | 8/1986 |
| DE | 296 12 555 U1 | 9/1996 |
| DE | 195 35 240 A1 | 3/1997 |
| DE | 203 17 269 U1 | 11/2004 |
| DE | 601 13 007 T2 | 3/2006 |
| DE | 10 2007 010 456 A1 | 12/2007 |
| EP | 0047927 | 3/1982 |
| EP | 05 05 809 A1 | 9/1992 |
| EP | 0 642 972 B1 | 8/1998 |

(Continued)

*Primary Examiner* — Henry Liu
(74) *Attorney, Agent, or Firm* — Milan Milosevic; Lisa Serdynski; Steven Courtright

(57) ABSTRACT

A multiple sprocket assembly for receiving a chain and transferring torque therefrom to a bicycle rear wheel hub rotatable about a hub axis. The chain has alternating pairs of inner and outer link plates connected by chain rollers. The multiple sprocket assembly includes a plurality of different-sized sprockets arranged coaxially about the rear wheel hub. The sprockets have a plurality of teeth and tooth roots spaced around a periphery of the sprockets for engaging the chain. The tooth roots forming a dedendum circle. The sprockets have a maximum sprocket width near the dedendum circle, substantially bridging a gap between paired inner link plates sandwiching the chain roller therebetween, substantially minimizing axial play between a guide area on the sprocket and an overhang of the inner link plates overlapping the guide area when the chain is engaged with the sprockets.

10 Claims, 1 Drawing Sheet

(56) References Cited

FOREIGN PATENT DOCUMENTS

| EP | 09 45 335 A1 | 9/1999 |
| EP | 1489338 | 12/2004 |
| EP | 1 167 174 B1 | 8/2005 |
| EP | 1 609 716 A2 | 12/2005 |
| GB | 475021 | 11/1937 |
| GB | 2171474 | 8/1986 |
| JP | 2848834 | 1/1999 |

* cited by examiner

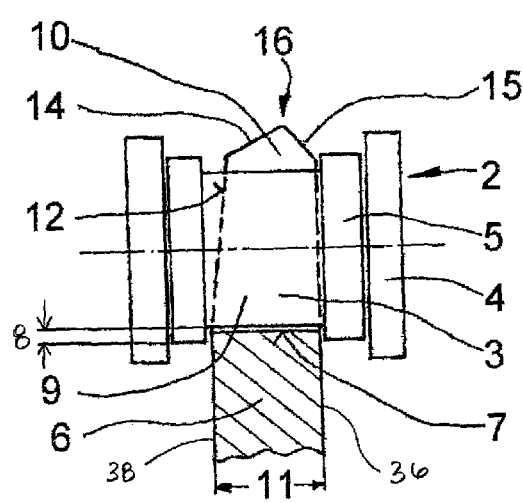
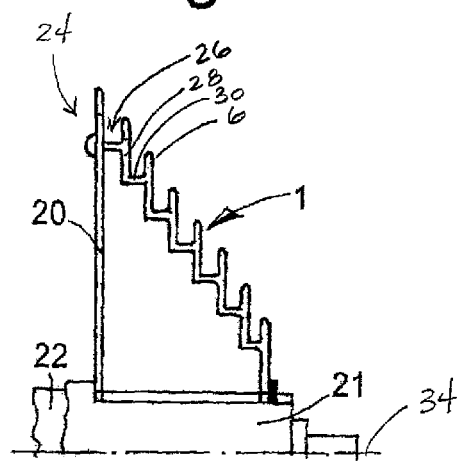
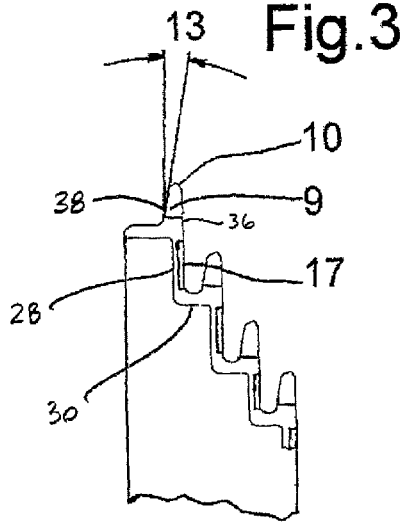
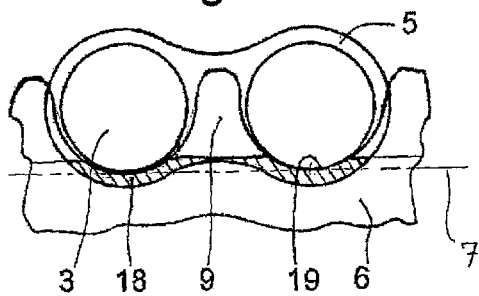

MULTIPLE SPROCKET ASSEMBLY

BACKGROUND OF THE INVENTION

The present invention relates to multiple sprocket assemblies for bicycles and more particularly, to a multiple sprocket assembly including sprockets having teeth with shifting aids that facilitate both shifting of the chain and maintaining chain engagement on the sprockets.

To enable controlled shifting from a larger sprocket to a smaller sprocket, a bicycle chain should be guided onto the destination sprocket. This is achieved by the chain rollers dropping into the tooth roots of the smaller sprocket, preventing the chain from riding on top of the teeth. An almost jerk-free shifting operation results, even under load. Several problems may occur while shifting to a smaller sprocket. The chain may not readily drop into its seated position on the destination sprocket. Even if the chain does drop into a seated position with the rollers seated in the tooth roots, there is no guarantee that the chain will remain engaged with the teeth due to excessive lateral play. Further, shifting errors may cause a chain to break under load, exposing the cyclist to an abrupt jerking motion causing muscles cramps.

SUMMARY OF THE INVENTION

The present invention provides a multiple sprocket assembly having sprockets with a specific geometry to provide optimal guiding of a chain onto its destination sprocket during shifting. The specific sprocket geometry may be adapted to any sprocket size. The multiple sprocket assembly receives the chain and transfers torque therefrom to a bicycle rear wheel hub rotatable about a hub axis. The chain includes alternating pairs of inner and outer link plates connected by chain rollers. The multiple sprocket assembly includes a plurality of different-sized sprockets arranged coaxially about the rear wheel hub. The sprockets have a plurality of teeth and tooth roots spaced around a periphery of the sprocket. The tooth roots form a dedendum circle. In one embodiment of the present invention, the sprocket has a maximum sprocket width near the dedendum circle, substantially bridging a gap between paired inner link plates sandwiching the chain roller therebetween, substantially minimizing axial play between a guide area on the sprocket and an overhang of the inner link plates overlapping the guide area when the chain is engaged with the sprockets.

The sprockets include a first guide slope on a tooth back face facing an adjoining larger sprocket. The first guide slope extends from a tooth tip toward the dedendum circle. The first guide slope may be linear. The guide slope progressively narrows the width of the tooth toward the tooth tip to prevent the pair of inner link plates from jamming on the tooth. When shifting the chain onto a smaller sprocket, the chain is guided by the first guide slope and/or a second guide slope on the tooth tip, positioning the chain such that the roller seats in the tooth root. Outer link plates do not guide the chain. The first guide slope may form an angle of 10 to 20 degrees with a sprocket back surface facing the adjoining larger sprocket. The sprocket back surface is perpendicular to the hub axis. For smaller sprockets, the first guide slope angle may be 5 to 15 degrees.

The tooth tip may include a third guide slope forming a ridge with the second guide slope therebetween. The second guide slope is on the tooth back face facing the adjoining larger sprocket and the third guide slope is on a tooth front face facing an adjoining smaller sprocket. The second and third guide slopes may be linear. The chain may be reliably guided into a seated position on the destination sprocket by one or both of the first and second guide slopes even under aggressive riding and shifting conditions. The ridge formed between the second and third guide slopes prevents the chain from riding on top of the teeth during a shift operation.

The third guide slope is narrower and steeper than the second guide slope. The third guide slope extends from the ridge to a sprocket front face facing the adjoining smaller sprocket, approximately one-third of the maximum sprocket width to optimally configure the available sprocket width.

The multiple sprocket assembly may include two parts mountable to the driver of the rear wheel hub. The first part is a largest sprocket having a profile on its smallest diameter to matingly engage and rotationally couple the largest sprocket to the driver. The second part is a hollow conical body including a plurality of annular support elements and the plurality of different-sized sprockets arranged coaxially about the hub in increasing diameter. The annular support elements are configured in a stepped arrangement to form the hollow conical body. To reduce weight, annular recesses are disposed beneath the dedendum circle. The hollow conical body is milled from solid stock. The proposed sprocket geometry is especially suitable for production of machining blanks for milled hollow conical body.

These and other features and advantages of the present invention will be more fully understood from the following description of one or more embodiments of the invention, taken together with the accompanying drawings.

BRIEF DESCRIPTION OF THE DRAWINGS

In the drawings:

FIG. 1 is a partial cross-sectional view of a chain engaging a sprocket tooth of a multiple sprocket assembly according to one embodiment of the present invention;

FIG. 2 is a cross-sectional view of the multiple sprocket assembly including a hollow conical body and a largest sprocket on a driver of a wheel hub;

FIG. 3 is a detailed partial cross-sectional view of the multiple sprocket assembly of FIG. 2 showing the hollow conical body having recesses; and FIG. 4 is a schematic side view of an inner link plate of the chain engaged with a sprocket tooth.

DETAILED DESCRIPTION

FIGS. 1-4 illustrate a multiple sprocket assembly 24 for receiving a bicycle chain 2 and transferring torque therefrom to a driver 21 of a bicycle rear wheel hub 22 according to one embodiment of the present invention. The multiple sprocket assembly 24 includes a hollow conical body 1 having a plurality of annular support elements 26 and a plurality of different-sized sprockets 6 supported by the annular support elements 26. Each sprocket 6 includes a plurality of teeth 9 and tooth roots 19 spaced around a periphery of the sprocket 6 for engaging the chain 2. The tooth roots 19 form a dedendum circle 7. Each annular support element 26 includes an annular cylinder 28 and an annular disc 30. The annular cylinders 28 extend along a hub axis 34 and have varying diameters. The annular discs 30 extend radially of the hub axis 34 and have varying diameters. The annular cylinders 28 and discs 30 are alternatingly arranged in a stepped sequence to form the hollow conical body 1. The annular support elements 26 and the sprockets 6 embody a single piece.

Looking to FIG. 1, a portion of the bicycle chain 2 is shown engaging the tooth 9 of the sprocket 6 of the multiple sprocket assembly 24. The bicycle chain 2 includes alternating pairs of inner and outer link plates 5, 4 connected by chain rollers 3. When the chain 2 is engaged with the tooth 9 of the sprocket 6, the chain roller 3 seats on the dedendum circle 7 and the pair of inner link plates 5 straddling the tooth 9. The inner link plates 5 form an overhang 8 extending beyond the chain roller 3, the overhang 8 extending within the dedendum circle 7. The tooth 9 has a first guide slope 12 on a tooth back face of facing an adjoining larger sprocket extending from a tooth tip 10 toward the dedendum circle 7. The first guide slope 12 forms an angle 13 of 10 to 20 degrees with a sprocket back surface 38 facing the adjoining larger sprocket perpendicular to the hub axis 34. The tooth tip 10 includes second and third guide slopes 14, 15 and a ridge 16 therebetween. The ridge 16 is located at a highest point of the tooth tip 10. The second guide slope 14 and the first guide slope 12 extend approximately two-thirds of the maximum sprocket width 11. The third guide slope 15 is a steeper than the second guide slope 14. The third guide slope 15 extends approximately one-third of the maximum sprocket width 11, from the ridge 16 to a sprocket front face 36 facing the adjoining smaller sprocket.

FIG. 2 shows the multiple sprocket assembly 24 including two parts mountable to the driver 21 of the rear wheel hub 22. The first part is a largest sprocket 20 having a profile on its smallest diameter to matingly engage and rotationally couple the largest sprocket 20 to the driver 21. The second part is the hollow conical body 1 including the plurality of annular support elements 26 and the plurality of different-sized sprockets 6 arranged coaxially about the hub 22 in increasing diameter. The driver 21 conveys the torque to the rear wheel hub 22.

Looking to FIG. 3, the annular discs 30 include recesses 17 incorporated during machining, the recesses 17 configured so that the remaining annular disc material is approximately half the sprocket width 11 to provide sufficient strength for machining and for torque transfer of the chain load. Because the recesses 17, reduced wall thicknesses are achieved in the interior of the hollow conical body 1 eliminating the need for additional milling operations for weight reduction. Since the crude part of the hollow conical body 1 is formed from solid stock, mostly by machining operations, the contour of the sprockets according to the invention is finally machined in this working step. This contour includes the first, second and third guide slopes 12, 14, 15, the planar sprocket front surface facing the smaller sprocket and also the recesses 17. These recesses 17 have the advantage that machining operations can be performed on the teeth 9 without abandoning the lightened structure of the hollow conical body 1.

Looking to FIG. 4, two rollers 3 and an inner link plate 5 are shown engaged with three teeth 9 of the sprocket 6. When the two rollers 3 are seated in the tooth roots 19, a portion of the inner link plate extends beyond the chain rollers 3 and into the dedendum circle 7 forming a guide area 18 on the sprocket 6 near the tooth roots 19. The guide area 18 overlaps with the overhang 8 of the inner link plate 5. The overhang 8 is the difference between the roller diameter and the inner link plate diameter near the dedendum circle 7. The maximum sprocket width 11 at the dedendum circle 7 substantially bridges the gap between paired inner link plates sandwiching the chain roller 3 therebetween, substantially minimizing axial play between the guide area 18 on the sprocket 6 and the overhang 8 of the inner link plates 5 overlapping the guide area 18 when the chain 2 is engaged with the sprocket 6. By substantially minimizing axially play, the chain 2 remains securely seated on the sprocket 6 during aggressive riding and backpedaling.

While this invention has been described by reference to one or more embodiments, it should be understood that numerous changes could be made within the spirit and scope of the inventive concepts described. Accordingly, it is intended that the invention not be limited to the disclosed embodiment, but that it have full scope permitted by the language of the following claims.

What is claimed:

1. A multiple sprocket assembly for receiving a chain and transferring torque therefrom to a bicycle rear wheel hub rotatable about a hub axis, the chain including alternating pairs of inner and outer link plates connected by chain rollers, the multiple sprocket assembly comprising:
   a plurality of different-sized sprockets arranged coaxially about the rear wheel hub,
   the sprockets having a plurality of teeth and tooth roots spaced around a periphery of the sprockets for engaging the chain, the tooth roots forming a dedendum circle,
   the teeth having a first guide slope on a tooth back face facing an adjoining larger sprocket, the first guide slope extending from a tooth tip to the dedendum circle, the tooth tip having a second guide slope on the tooth back face and a third guide slope on a tooth front face facing an adjoining smaller sprocket, the second and third guide slopes meeting at a line defining a ridge therebetween.

2. The multiple sprocket assembly of claim 1 wherein the second and third guide slopes are linear.

3. The multiple sprocket assembly of claim 2 wherein the sprockets have a maximum sprocket width near the dedendum circle, the third guide slope extending from the ridge to a sprocket front face facing the adjoining smaller sprocket, approximately one-third of the maximum sprocket width.

4. The multiple sprocket assembly of claim 3 wherein the third guide slope is steeper than the second guide slope relative to a sprocket back surface.

5. The multiple sprocket assembly of claim 1 further comprising a hollow conical body including a plurality of annular support elements extending between the different-sized sprockets, the annular support elements and the different-sized sprockets embodying a single piece, each annular support element includes an annular cylinder extending along the hub axis and an annular disc extending radially of the hub axis, the annular disc including an annular recess.

6. The multiple sprocket assembly of claim 1, wherein the sprockets have a maximum sprocket width near the dedendum circle, substantially bridging a gap between paired inner link plates sandwiching the chain roller therebetween, substantially minimizing axial play between the paired inner link plates and a guide area defined on the sprockets by an overlap of the inner link plates and the sprockets when the chain is engaged with the sprockets.

7. The multiple sprocket assembly of claim 2 wherein the first, second and third guide slopes are linear.

8. The multiple sprocket assembly of claim 7 wherein the first guide slope forms an angle of 10 to 20 degrees with a sprocket back surface facing the adjoining larger sprocket, the sprocket back surface perpendicular to the hub axis.

9. The multiple sprocket assembly of claim 7 wherein the first guide slope forms an angle of 5 to 15 degrees with a sprocket back surface facing the adjoining larger sprocket, the sprocket back surface perpendicular to the hub axis.

10. The multiple sprocket assembly of claim 1 further comprising a hollow conical body including a plurality of annular support elements extending between the different-sized sprockets, the annular support elements and the different-sized sprockets embodying a single piece, each annular support element includes an annular cylinder extending along the hub axis and an annular disc extending radially of the hub axis, the annular disc including an annular recess.

* * * * *